(12) United States Patent
Truax

(10) Patent No.: US 7,685,961 B2
(45) Date of Patent: Mar. 30, 2010

(54) SURVEY MARKER

(76) Inventor: Clarence E. Truax, 520 Fairground Rd., Taylorsville, KY (US) 40071

( * ) Notice: Subject to any disclaimer, the term of this patent is extended or adjusted under 35 U.S.C. 154(b) by 0 days.

(21) Appl. No.: 11/983,130

(22) Filed: Nov. 7, 2007

(65) Prior Publication Data

US 2008/0134954 A1  Jun. 12, 2008

(51) Int. Cl.
*G01C 15/04* (2006.01)
(52) U.S. Cl. .................. 116/209; 52/103
(58) Field of Classification Search .......... 116/200, 116/209; 248/530; 52/103, 157
See application file for complete search history.

(56) References Cited

U.S. PATENT DOCUMENTS

| | | | |
|---|---|---|---|
| 13,656 A | 10/1855 | Patton | |
| 191,919 A | 6/1877 | Bonner | |
| 427,394 A | 5/1890 | Brown | |
| 482,062 A * | 9/1892 | McBroom | 52/103 |
| 1,219,454 A | 3/1917 | Hanson | |
| 1,558,078 A | 10/1925 | Darby | |
| 1,817,447 A | 8/1931 | Simpson | |
| 1,950,298 A * | 3/1934 | Frost | 40/124.5 |
| 2,154,966 A | 4/1939 | Vanderveer | |
| 2,181,032 A | 11/1939 | Watkins | |
| 3,205,626 A | 9/1965 | Attenberger | |
| 3,318,560 A * | 5/1967 | Garrette, Jr. et al. | 248/545 |
| 3,321,834 A | 5/1967 | Burns | |
| 3,503,163 A | 3/1970 | Lutz | |
| 3,662,436 A | 5/1972 | Roza | |
| 3,685,237 A | 8/1972 | Johnson | |
| 3,709,188 A | 1/1973 | Coupar | |
| 3,824,748 A | 7/1974 | Pichowicz | |
| 3,916,821 A * | 11/1975 | Pies | 52/103 |
| 3,927,637 A | 12/1975 | Sammaritano | |
| D246,513 S | 11/1977 | Garneau | |
| 4,127,972 A | 12/1978 | Reimoser | |
| 4,185,424 A | 1/1980 | Streit | |
| 4,254,597 A * | 3/1981 | Feldman et al. | 52/103 |
| 4,441,288 A * | 4/1984 | Feldman et al. | 52/103 |
| 4,502,258 A | 3/1985 | Rushing | |
| 4,738,060 A | 4/1988 | Marthaler et al. | |
| 4,741,701 A | 5/1988 | Kossor | |
| 4,803,812 A * | 2/1989 | Alexander, Sr. | 52/157 |
| 4,970,795 A | 11/1990 | Woodward et al. | |
| 5,056,454 A * | 10/1991 | Turner | 116/209 |
| 5,148,641 A * | 9/1992 | Rushing et al. | 52/103 |
| 5,174,237 A | 12/1992 | Beard | |
| 5,291,703 A | 3/1994 | Ziegler | |
| D359,437 S * | 6/1995 | Bilotti | D8/349 |
| 5,471,899 A | 12/1995 | Twomlow | |
| 5,722,788 A | 3/1998 | Bent et al. | |
| D394,221 S | 5/1998 | Truax | |
| D395,251 S | 6/1998 | Truax | |
| D395,608 S | 6/1998 | Truax | |
| D395,610 S | 6/1998 | Truax | |
| 5,771,835 A | 6/1998 | Schneider | |

(Continued)

*Primary Examiner*—Richard A. Smith
*Assistant Examiner*—Tania C Courson
(74) *Attorney, Agent, or Firm*—Carrithers Law Office, Pllc; David W. Carrithers

(57) ABSTRACT

A survey marker having a rod with a pointed tip and a shank extending therefrom composed of a rod or rebar material. A head extending from a distal end of the rod opposite the point may include means for retaining a survey flag, means for engaging a drive tool, and means for alignment.

20 Claims, 4 Drawing Sheets

U.S. PATENT DOCUMENTS

| | | |
|---|---|---|
| D399,158 S | 10/1998 | Truax |
| D402,908 S | 12/1998 | Machen et al. |
| 5,993,105 A | 11/1999 | Chan |
| D424,960 S | 5/2000 | Greene et al. |
| 6,058,662 A | 5/2000 | Perko |
| 6,379,020 B1 | 4/2002 | Lewis et al. |
| D457,085 S | 5/2002 | Truax |
| 6,536,369 B1 | 3/2003 | Bent et al. |
| 6,578,512 B2 | 6/2003 | Truax |
| 6,832,575 B2 | 12/2004 | Carroll, Jr. |
| D531,071 S | 10/2006 | Truax |
| 2004/0031214 A1* | 2/2004 | Fong et al. .................... 52/103 |

* cited by examiner

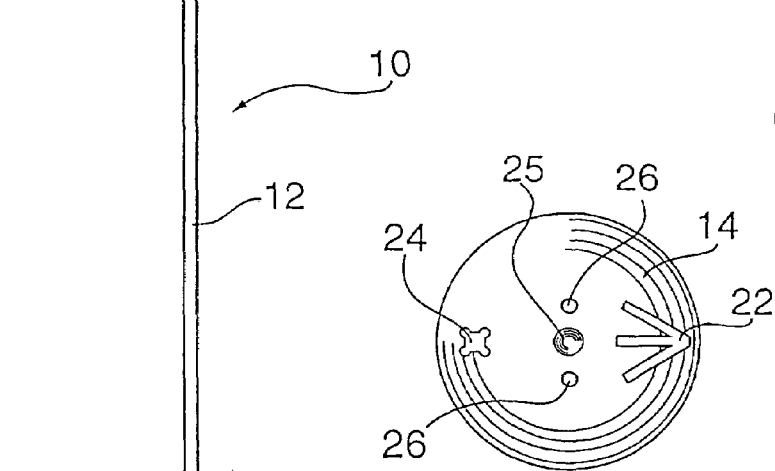
FIG. 1
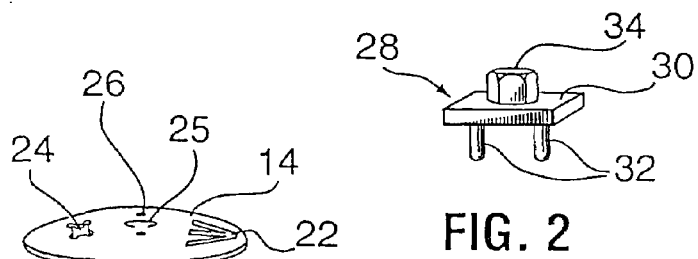
FIG. 2
FIG. 3
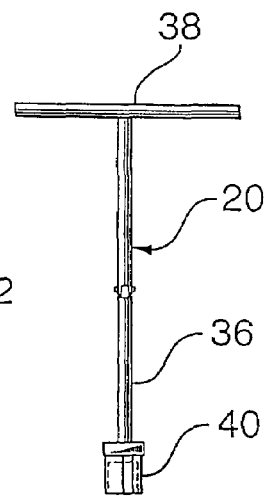
FIG. 4
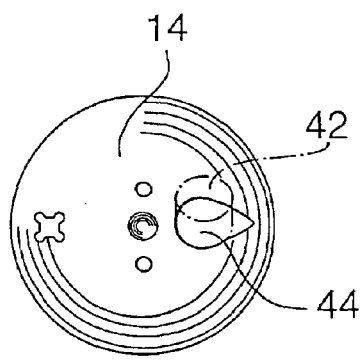
FIG. 5

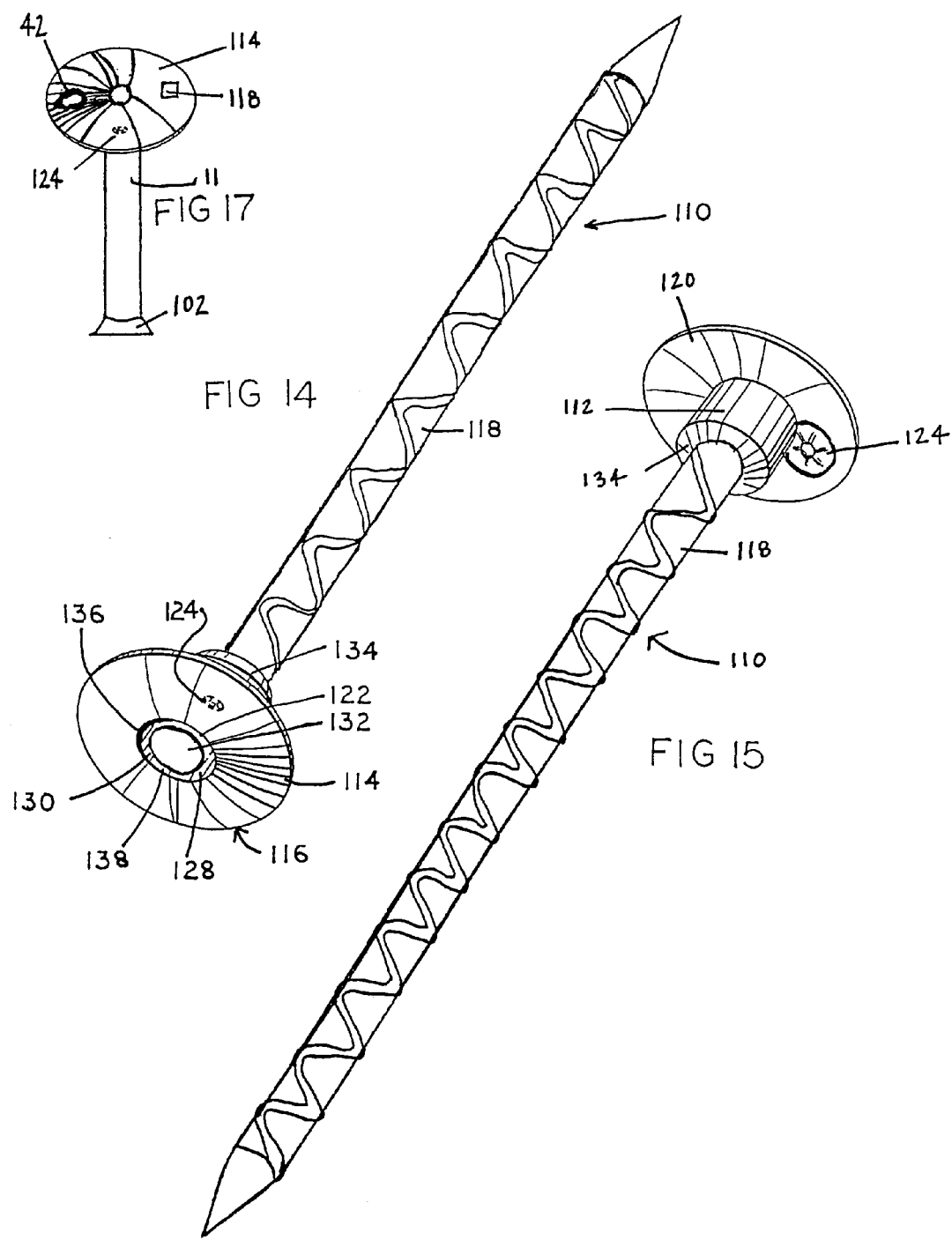

SURVEY MARKER

CROSS REFERENCE TO RELATED APPLICATIONS

This application claims priority from U.S. Provisional Application Ser. No. 60/495,979 filed on Aug. 18, 2003 and U.S. application Ser. No. 10/920,702 filed on Aug. 18, 2004 both of which are incorporated by reference herein in their entirety. Reference to documents made in the specification is intended to result in such patents or literature cited are expressly incorporated herein by reference, including any patents or other literature references cited within such documents as if fully set forth in this specification.

BACKGROUND OF THE INVENTION

1. Technical Field

The present invention relates to survey markers.

2. Description of the Prior Art

Conventional survey indicators consist of plates, spikes, posts, or rods driven in, placed, or attached to natural geographic structures such as rocks or trees. Most permanent markers are formed of concrete posts or the like utilizing a plate or disk having the requisite markings and indicators affixed to or molded therein.

The surveyor usually surveys the tract of property to obtain the boundaries and uses temporary markers, such as pins or pegs having indicia or markings thereon. At a later time the surveyor or some other person must return to the numerous survey reference point cites and affix a more permanent marker at the site.

Permanent markers now used in the industry such as concrete post are heavy and difficult to carry and require a vehicle to transport them to the marker sites. Sometimes the vehicles cannot be driven close to the marker site and the difficult and time consuming task falls upon the surveying team to move the marker to the site. Moreover, these concrete markers are dangerous to walk around or over, or to mow over once vegetation such as grass crops or weeds hide them over time.

None of the above known types of survey markers, taken either singly or in combination, is seen to describe the instant invention as claimed in the instant application.

SUMMARY OF THE INVENTION

The present invention achieves the above objects by providing a survey marker having a body formed of a rod having a pointed tip with an elongated shaft made of a rod or rebar material and having a generally flat or convex shaped head extending from the distal end of the rod head connected thereto including a means for cooperatively engaging a device for rotating and driving the survey marker into the ground. The head also includes means for removably attaching a survey marker peg and permanently attaching an indicator or locator rod thereto.

More particularly, a preferred embodiment of the survey marker of the present invention includes a rod having a pointed tip and a head extending from a distal end of the rod opposite the point includes means for retaining a survey flag, means for engaging a drive tool, and means for alignment.

Accordingly, one object of the present invention is to provide a permanent survey marker which is light enough to be carried with the surveyor on the initial survey and placed into the ground to form a permanent survey marker.

Another object of the present invention is to incorporate a directional indicator on the survey marker and optionally to provide indicia or stamped markings indicating north, south, east, west and/or hash marks and/or degrees.

Another object of the present invention is to provide a metal or plastic disk such as a washer or the like to fit around the periphery of the marker and be attached thereto providing indicia or stamped markings indicating north, south, east, west and/or hash marks and/or degrees.

Another object of the present invention is to provide a metal or plastic disk such as a plate having a center hole therein for disposing the rod body, wherein the outer edge of the plate extends outwardly past the periphery of the head including means for locking the plate in place to the head wherein the plate can provide indicia or stamped markings indicating north, south, east, west and/or hash marks and/or degrees.

Another object of the present invention is to provide a survey marker driving means consisting of a rod having a first end with a means of attaching to the survey marker head or mounting thereto and having a handle formed by a cross member attached to the opposing end of the driving means.

It is another object of the present invention to provide a driving means having a rod or shank long enough to permit the user to place the survey marker rotatingly in the ground without having to kneel on the ground.

It is another object of the present invention to provide a driving means which optionally includes a shaft which is telescoping or extendible which can be locked into the telescoping position by pins, spring loaded tabs and slot arrangements, or by a rotating frictional locking mechanism.

It is another object of the present invention to provide a survey marker having a generally smooth head whereby it can be walked over or mowed over without tripping or injuring the person or damaging the vehicle.

It is another object of the present invention to provide a convex plate shaped head for the survey marker forming a dome having a convex top surface and concave bottom surface.

It is another object of the present invention to provide a convex plate shaped head for the survey marker forming a dome having a convex top surface and a flat bottom surface.

It is another object of the present invention to fabricate the survey marker from stainless steel, brass, aluminum, fiberglass, or graphite composite material to prevent corrosion and promote longtivity.

It is another object of the present invention to utilize steel, aluminum, plastic or fiberglass permanent locating rods up to three feet in length for extending from the top of the survey marker when used for farm land, large lots, and subdivision lots which can be cut off before sod, straw, or seeding goes down.

Other objects, features, and advantages of the invention will be apparent with the following detailed description taken in conjunction with the accompanying drawings showing a preferred embodiment of the invention.

BRIEF DESCRIPTION OF THE DRAWINGS

A better understanding of the present invention will be had upon reference to the following description in conjunction with the accompanying drawings in which like numerals refer to like parts throughout the several views and wherein:

FIG. 1 is a perspective view showing the present invention in contact with the surface of the ground whereby the shaft includes a flight spaced apart from the head and tip of the shaft;

FIG. 2 is a perspective view of an insertion tool for providing cooperative engagement between the survey head and driving tool;

FIG. 3 is a top plan view of the survey marker head;

FIG. 4 is an elevational view of the driving tool for connecting with the insertion tool and rotating and driving the survey marker rod into the ground;

FIG. 5 is a plan top view of the head of an alternate embodiment having an alignment arrow forming a conical shape and showing a survey cap as a cylindrical member wedged into the alignment arrow void;

FIG. 14 is a perspective top view showing the head of the survey marker of the embodiment shown in FIG. 12 showing the distal end of the rebar protruding through a depression formed in the top of the head and showing the flag rod hole with the prongs of the star retaining washer;

FIG. 15 is a perspective view showing the underside of the head of the embodiment of FIG. 12 and the star retaining washer affixed thereto;

FIG. 17 is a perspective view showing a side view of the embodiment of FIG. 12 with the rebar, a side view of the embodiment of FIG. 10 with the spike, and a top view of the embodiment of FIG. 11 showing the base.

DESCRIPTION OF THE PREFERRED EMBODIMENT

Figure 6:
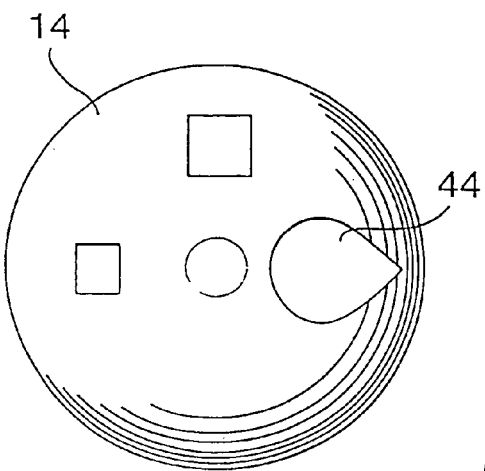
FIG. 6 is a top view showing another preferred embodiment with the head including an drop shaped arrow aperture disposed on one side of the central positioning dimple, showing a square rod aperture opposite thereof, and a square aperture on the side thereinbetween for engaging a rotating tool.

The survey marker 10 of the present invention as shown in FIG. 1 includes a longitudinal rod 12 for anchoring the survey marker 10 in the earth, and a head portion 14 serving as an indicator source. More particularly, the rod 12 includes a pointed tip 16; however, it is contemplated that a tip having a screw, flat tip, chisel tip, or other cutting edge may be utilized to enhance penetrability of the tip 16 in a hard substrate. The rod 12 of the preferred embodiment is rebar.

The head 14 attached to the distal end of the rod 12 is generally convex in shape forming a plate having a center point an side edges curving downward therefrom. It is contemplated the head can be formed having a convex top surface and concave bottom surface, or having a convex top surface and flat bottom surface; however, the preferred embodiment is shown in FIG. 1. The head 14 may be a thin metal plate or be solid. Indicia may be printed upon the top surface of the head or on a washer or plate attached to the outer edge of the head or have a central hole therein for extending the rod 12 there through. The washer or plate would have a larger diameter than the head in order for the indicia consisting of hash marks 62, degrees, north, south, east, west indicia 60 or the like to be shown around the periphery of the head 14. Furthermore, the preferred embodiment includes an alignment arrow 22 and a survey flag (locator) retaining hole 24. The survey flag may be held by a long rod 70 composed of plastic or fiberglass. The retaining hole 24 shown in FIG. 3 is 'X' shaped in order for the rod to be inserted therethrough and twisted to hold the rod 12 in place in a permanent manner. Moreover the head 14 includes a central dimple 25, hole, or depression for locating and aligning the surveying instrument 90.

A means for rotating the survey marker 10 consists of a pair of holes 26 formed through the top of the head 14 for cooperatively engaging an insertion tool 28 having a flat base 30 with a pair of spaced apart aligned pegs 32 for cooperatively engaging the holes 26. A drive nut 34 or other means of attachment, interlocking, or cooperatively engaging a means for driving such as a drive tool 20 is attached to the top of the flat base 30.

The drive tool of the present invention includes a longitudinal member 36 connecting to a means for rotating such as a handle 38 formed by a short rod or bar extending normal to the longitudinal member 36 intersecting the midpoint thereof. A means 40 for cooperatively engaging the drive nut 34 of the insertion tool 28 such as a socket 40 extends from the distal end of the drive tool opposite the handle 38. Moreover, the drive tool 20 may have hinged segments, or utilize telescoping sections held into position with spring loaded tabs and slots, pins and slots, or frictional twist holing means, so that the drive tool 40 is collapsible. Finally different types of means of driving can be utilized with or instead of the socket 40.

It is contemplated that the drive nut 34 or other means of cooperatively engaging the drive tool 20 could be formed or attached to the head 14 and be integral with. Also a strong arm, tire tool, socket wrench with extension or any other tool could be used to engage and rotate the drive nut of the insertion tool.

As best shown in FIGS. 5-8, the alignment arrow may be formed as round alignment arrow aperture hole 42 for cooperative engagement with a tear shaped indicator stopper or cap 44, or the aperture 42 may be formed in a tear shape. A rubber stopper or survey cap 44 may be driven or screwed into the alignment arrow aperture 42 or other aperture providing a means for holding such as best shown in FIG. 5, and indicia may be included thereon.

Figure 7:
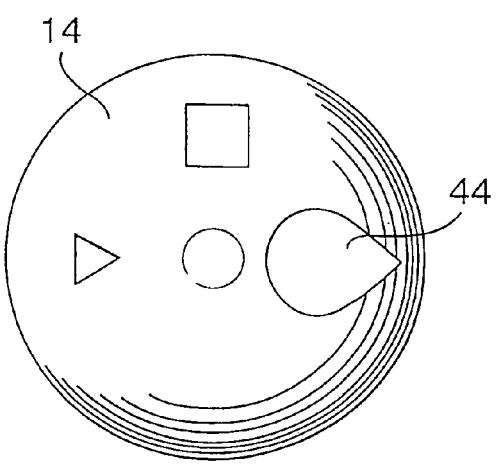
FIG. 7 is a top view showing another preferred embodiment with the head including an drop shaped arrow aperture disposed on one side of the central positioning dimple, showing a triangular rod aperture opposite thereof, and a square aperture on the side thereinbetween for engaging a rotating tool.
Figure 8:
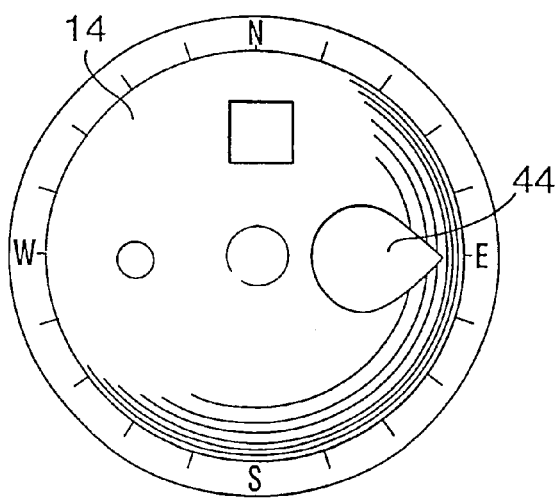
FIG. 8 is a top view of another preferred embodiment showing the head including an drop shaped arrow aperture disposed on one side of the central positioning dimple, showing a round rod aperture opposite thereof and a square aperture on the side thereinbetween for engaging a rotating tool.
Figure 9:
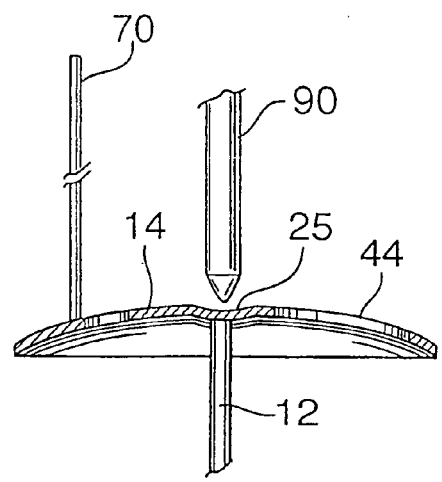
FIG. 9 is a sectional view of FIG. 5 showing the upper convex surface and lower concave surface of the head.

FIGS. 6-8 and 17 utilize a ratchet aperture 46 providing a square hole 11 for cooperative engagement with the square male end of a ratchet or strong arm or extension shaft connected thereto in order to rotate the survey marker 10 and screw the flights 18 of the rod 12 into the ground. As shown in FIG. 6, the head 14 includes a drop shaped arrow aperture 44 disposed on one side of the central positioning dimple 25, showing a square rod aperture 24 opposite thereof, and a square aperture on the side thereinbetween for engaging a rotating tool. As illustrated in FIG. 7, the head 14 includes a drop shaped arrow aperture 44 disposed on one side of the central positioning dimple 25, showing a triangular rod aperture 24 opposite thereof, and a square aperture on the side thereinbetween for engaging a rotating tool. FIG. 8 shows the head 14 including an drop shaped arrow aperture 44 disposed on one side of the central positioning dimple 25, showing a round rod aperture 24 opposite thereof and a square aperture 46 on the side thereinbetween for engaging a rotating tool.

Although the ratchet aperture 46 is offset from the center of the head 14, it is disposed at a position which still allows the rotation of the head 14 with a ratchet or other driving means. Of course, the central positioning dimple 25 can be shaped to cooperatively engage a driving means, such as the square shaft of an extension tool or be formed as a slit or slot for connecting with other driving tools. The dimple 25 can also be cut through the head creating an aperture therethrough to accommodate a driving means or be threaded for engaging a bolt having an engageable head.

To use the survey marker shown in FIGS. 1-9, simply push or press the rod 12 of the survey marker 10 into the ground and rotate the survey marker 10 using the drive means, whether it be the 'T-tool' and insertion tool for mounting within the head apertures, insertion of the distal end of a male longitudinal member of a strong arm or ratchet, or extension shaft extending therefrom cooperatively engaging the ratchet aperture 46. The alignment arrow 22 or alignment aperture 44 are oriented to point in the direction of the next survey marker 10. Once the survey marker 10 has been aligned, the insertion tool 28, ratchet, strong arm, or other means for rotation are removed and the survey flag rod can be inserted into the retaining hole 24. After the surveying has been completed the flag pole is cut or broken off at ground level. The survey marker 10 remains as a permanent marker.

Figure 12:
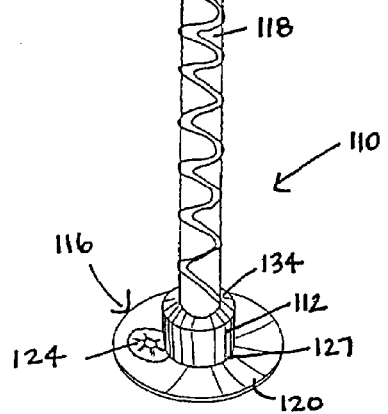
FIG. 12 is a perspective view showing an alternate embodiment showing the concave head having a small round hole offset from the center for holding the flag rod utilized with a rod formed of rebar extending from the underside through the center of a hole formed in the head whereby the edges of the hole can be depressed forming a neck or collar extending from the bottom surface of the head for cooperative engagement onto the top of the rebar rod with the sidewalls fitting within the recess or circular slot formed around the rebar and the rebar not extending pass the top surface of the head forming a generally smooth dome shaped top surface.
Figure 10:
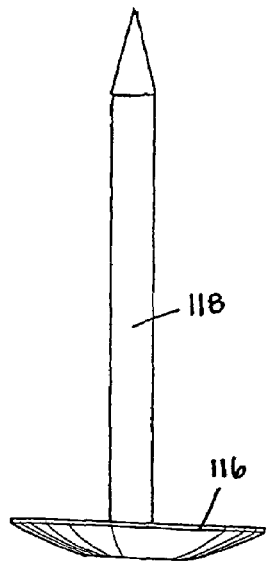
FIG. 10 is perspective view showing an alternate embodiment showing the head of the embodiment of FIG. 8 utilized with a spike extending from the underside thereof defining a pointed rod for piercing asphalt, gravel, or soil.
Figure 11:
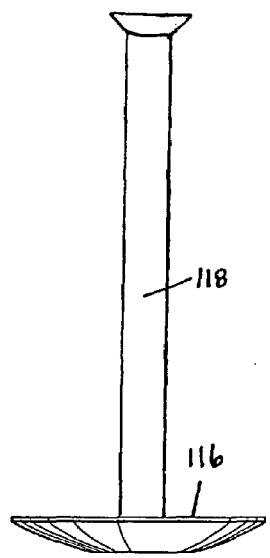
FIG. 11 is a perspective view showing an alternate embodiment showing the head of the embodiment of FIG. 8 utilized with a spike extending from the underside thereof defining a rod including a base of greater diameter than the rod and having a flat surface for disposing in fresh concrete or to be disposed within another viscous surface substrate.
Figure 13:
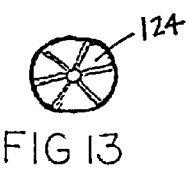
FIG. 13 is a perspective view showing a star retaining washer which is cut into the surface of the head or formed from a flat member comprising a washer having a star shaped pattern cut through the center thereof and affixed to the underside of the head by welding or other means having the center aligned with the hole for holding the survey marker flag rod having a slightly larger diameter than the center portion of the star whereby pushing the rod thorough the star biases the projections of the star downward gripping the rod and causes resistance to removal of same.

As best shown in FIG. 10 an alternate embodiment utilizes a spike extending from the underside of the head defining a pointed rod for piercing asphalt, gravel, or soil. Another embodiment is shown in FIG. 11 with a spike extending from the underside thereof defining a rod including a base 102 of greater diameter than the rod and having a flat surface for disposing in fresh concrete or to be disposed within another viscous surface substrate;

FIG. 12 illustrates an embodiment showing a concave head having a small round hole offset from the center for holding the flag rod utilized with a rod formed of rebar extending from the underside through the center of a hole formed in the head whereby the edges of the hole can be depressed forming a neck or collar extending from the bottom surface of the head for cooperative engagement onto the top of the rebar rod with the sidewalls fitting within the recess or circular slot formed around the rebar and the rebar not extending pass the top surface of the head forming a generally smooth dome shaped top surface. A star retaining washer which is affixed to the underside of the head by welding or other means having the center aligned with the hole for holding the survey marker flag rod having a slightly larger diameter than the center portion of the star whereby pushing the rod thorough the star biases the projections of the star downward gripping the rod and causes resistance to removal of same as shown in FIG. 13. Of course the star may be utilized with any of the embodiments shown in FIGS. 1-17.

FIG. 14 is a perspective top view showing the head of the survey marker of the embodiment shown in FIG. 12 showing the distal end of the rebar protruding through a depression formed in the top of the head and showing the flag rod hole with the prongs of the star retaining washer. FIG. 15 shows the underside of the head of the embodiment of FIG. 12 and the star retaining washer affixed thereto as well as a collar affixed to the central bottom surface of the head cooperatively sized to accommodate a rod or length of rebar which may be pressed fit, screwed, glued, or welded therein. It is a particular advantage of the present invention to utilize the head and shaft in two separate pieces so they may be assembled in the field.

Figure 16:
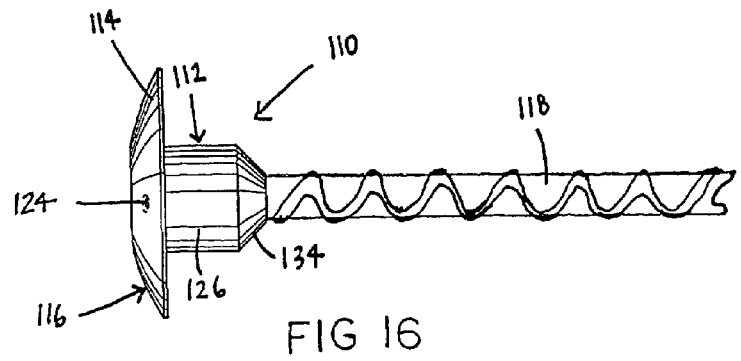
FIG. 16 is a perspective view showing a side view of the embodiment of FIG. 12 with the rebar and a collar extending from the bottom of the head to reinforce the attachment and support of the rebar within the head, a bottom view of the embodiment of FIG. 10 with the spike and a bottom view of the embodiment of FIG. 11 showing the base.

As best shown in FIG. 16, the collar extending from the bottom surface of the head reinforces the attachment and support of the rebar, spike, or rod within the head.

As shown in the drawings 12-16, one embodiment of the survey marker 110 includes a head 116 comprising a convex upper surface 114 and a concave lower surface 120. The head 116 including a center opening 122 therethrough and at least one offset aperture 124 for retaining a flag rod 118 therein. A collar 112 having a center opening 130 therethrough defining an interior surface 128 and including an exterior surface 126 is coaxially aligned with the center opening 122 of the head 116 and is attached at an upper end 127 to the concave lower surface 120 of the head 116. The collar 112 extends downward from the concave lower surface 120 of the head 116. The center opening 130 of the collar 112 encloses the end 132 of the rod 118 extending though the collar 112 in a coaxial relationship. The rod 118 is affixed to the bottom end 134 of the collar 112. As best shown in FIG. 16, the collar 112 extending from the concave lower surface 120 of the head 116 reinforcing the attachment and support of the rebar, spike, or rod longitudinal member 118 to the head 116. The rod 118 does not extend thorough the head 116 past the convex upper surface 118. The end 132 of the rod 118 extends through the center opening 130 of the collar 112 to a point equal to or less than an edge 136 of the center opening 122 of the head 116. The rod 118 is spaced apart from an edge 136 of the center opening 122 of the head 116 and is spaced apart from the interior surface 128 of the collar 112 forming an annular groove 138 between the rod 118, and the edge 136 of the head 116 and the interior surface 128 of the collar 112. The annular groove 138 provides a space for the end 132 of the rod 118 in the center of the head to expand or spread as the marker hammered and driven into the ground. The annular groove 138 may also serve as an alternate positioning point for cooperatively engaging a rod.

It is contemplated that any of the heads or rods shown in FIGS. 1-17 can be utilized one with another, i.e. the features such as the tear dropped locator hole or ratchet attachment hold head shown in the embodiment of FIG. 8 can be utilized with the head of the embodiment of FIG. 12 having a rebar rod.

The foregoing detailed description is given primarily for clearness of understanding and no unnecessary limitations are to be understood therefrom, for modification will become obvious to those skilled in the art upon reading this disclosure and may be made upon departing from the spirit of the invention and scope of the appended claims. Accordingly, this invention is not intended to be limited by the specific exemplifications presented hereinabove. Rather, what is intended to be covered is within the spirit and scope of the appended claims.

I claim:

1. A survey marker, consisting of a head comprising a convex upper surface and a concave lower surface, said head including a center opening there through; a longitudinal rod; and a collar including a center opening there through and an exterior surface and an interior surface, said collar coaxially aligning with said center opening of said head, an upper end of said collar attaching to said concave lower surface of said head, said collar extending downward from said concave lower surface of said head, said center opening of said collar enclosing an end of said rod extending there through in a coaxial relationship, said rod affixing to a bottom end of said collar, said end of said rod extending through said center opening of said collar to a point equal to or less than an edge of said center opening of said head spacing said rod apart from said edge of said center opening of said head and said center opening of said collar forming annular groove there between.

2. The survey marker of claim 1 further comprising at least one offset aperture for retaining a survey flag rod therein.

3. The survey marker of claim 1 including means for aligning.

4. The survey marker of claim 3, wherein said means for aligning comprises a arrow.

5. The survey marker of claim 1, wherein said head includes markings or indicia selected from the group consisting of letters, words, hash marks and degrees.

6. A survey marker, comprising:
a head comprising a generally convex upper surface and a generally concave lower surface;
a longitudinal rod;
a collar coaxially aligning with said head;
an upper end of said collar attaching to said concave lower surface of said head;
said collar extending downward from said concave lower surface of said head;
said rod attaching to a bottom end of said collar;
said collar including a center bore extending there through;
said rod extending through said bore of said collar;
said head providing a generally flat surface flush with the ground upon insertion therein.

7. The survey marker of claim 6, wherein said head includes a center opening.

8. The survey marker of claim 6, said collar including a center opening there through and an exterior surface and an interior surface.

9. The survey marker of claim 8, wherein said interior surface of said center opening of said collar and a top edge of said center opening of said head are spaced apart from said rod an equal distance forming an annular groove there between.

10. The survey marker of claim 9, wherein said end of said rod extends through said opening in said collar to a point equal to or less than said top edge of said center opening of said head.

11. The survey marker of claim 6, said end of said rod extending through said center opening of said collar in a coaxial relationship.

12. The survey marker of claim 6, further comprising at least one offset aperture for retaining a survey flag rod therein.

13. The survey maker of claim 6, including a base of greater diameter than said rod, said base having a flat bottom surface for disposing in fresh concrete or to be disposed within another viscous surface substrate.

14. The survey marker of claim 6, said head including a central opening there through and said central opening of said head and said bore of said collar being of a larger diameter than a diameter of said rod extending there through forming means for expanding defining an annular groove there between.

15. A survey marker, consisting essentially of:
a head having a convex upper surface and a concave lower surface, said head including central opening there through;
a collar including a center opening defining a bore there through having an upper end affixed to a said lower surface of said head;
said collar coaxially aligning with a center of said head;
a longitudinal rod;
said rod extending coaxially through said bore of said collar and said central opening of said head;
said rod attaching to at least a lower end portion of said collar at a point near a distal end of said rod,
said central opening of said head being of a larger diameter than a diameter of said rod extending there through forming means for expanding there between; and
said distal end of said rod extending through said central opening of said head to a point equal to or less than an inner edge of said central opening of said head providing a flush surface.

16. The survey marker of claim 15, wherein means for expanding comprises an annular groove disposed between said central opening in said head and said rod.

17. The survey marker of claim 15, wherein said bore of said collar comprises at least an upper portion having a larger diameter than said diameter of said rod extending there through forming means for expanding there between.

18. The survey marker of claim 17, wherein means for expanding comprises an annular groove disposed between said upper portion of said bore of said collar and said rod.

19. The survey marker of claim 15, further comprising at least one aperture for retaining a survey flag rod therein.

20. The survey marker of claim 15 wherein said lower end of said collar is conically shaped for insertion into the ground.

* * * * *